(12) United States Patent  
Hyslop (10) Patent No.: US 7,455,310 B2  
(45) Date of Patent: Nov. 25, 2008

(54) FLOATING BOAT TRAILER

(76) Inventor: William J. Hyslop, 105 Jefferson Valley, Coatesville, IN (US) 46121

( * ) Notice: Subject to any disclaimer, the term of this patent is extended or adjusted under 35 U.S.C. 154(b) by 0 days.

(21) Appl. No.: 11/735,650

(22) Filed: Apr. 16, 2007

(65) Prior Publication Data

US 2007/0241534 A1    Oct. 18, 2007

Related U.S. Application Data

(60) Provisional application No. 60/792,898, filed on Apr. 18, 2006.

(51) Int. Cl.  
    *B60D 3/10*    (2006.01)
(52) U.S. Cl. .................................. 280/414.1
(58) Field of Classification Search ............. 280/414.1, 280/414.3  
    See application file for complete search history.

(56) References Cited

U.S. PATENT DOCUMENTS

| 4,099,279 A | * | 7/1978 | Park ........................... 114/344 |
| 4,395,185 A | * | 7/1983 | Whaley ....................... 414/483 |
| 4,626,162 A | * | 12/1986 | Parisi .......................... 414/479 |
| 5,165,706 A | | 11/1992 | Fond ........................ 280/414.1 |
| 5,228,713 A | | 7/1993 | Kovach ..................... 280/414.1 |
| 5,320,058 A | * | 6/1994 | Reed ........................... 114/344 |
| 6,598,896 B1 | * | 7/2003 | Hyslop ..................... 280/414.1 |
| 6,685,209 B1 | * | 2/2004 | Guio ......................... 280/414.1 |

* cited by examiner

*Primary Examiner*—Tony H. Winner  
(74) *Attorney, Agent, or Firm*—Woodard, Emhardt, Moriarty, McNett & Henry LLP (57) ABSTRACT

A floating boat trailer for use with an automatic latching device for securing a boat includes a frame constructed and arranged to accommodate floatation panels, a hinged linkage mechanism having a spring steel extension blade attached to the trailer tongue, a pneumatic cylinder operable from a control transmitter to effect movement of the hinged linkage and a keel guide roller mounted on a spring steel plate located ahead of the bunker rails to keep the boat centered on the trailer and direct the U-bolt into the automatic latching device. A receiver, two pneumatic solenoid valves mounted on the winch stand, and a hand-held transmitter to operate them. A sealed winch stand upright acts as an air system surge tank for a tongue-mounted air compressor or for a compressor located in a towing vehicle. A pair of air springs, mounted in the trailer suspension system, allows the wheels to be raised or lowered by applying or removing air pressure.

7 Claims, 8 Drawing Sheets

FLOATING BOAT TRAILER

CROSS REFERENCES TO RELATED APPLICATIONS

The present application is a Continuation-In-Part of and claims the benefit of U.S. Provisional Patent Application Ser. No. 60/792,898, filed Apr. 18, 2006, entitled "FLOATING BOAT TRAILER" which is hereby incorporated by reference in its entirety.

BACKGROUND OF THE INVENTION

When an automatic latching device is used or is not used as part of a boat trailer, the boat needs to be propelled up onto the trailer with sufficient speed and momentum to engage the bow roller or an automatic latching device. The typical approach is to keep the trailer on the loading ramp and the back half under the water. This then requires more speed or momentum for the boat to reach the bow roller or automatic latching device as the boat has to be driven up the incline of the trailer. This in turn causes added wear on the automatic latching device due to the impact force.

It would be an improvement to the typical boat loading procedure when an automatic latching device is used to be able to float the trailer in the water so that less speed and less momentum is required to ramp the boat onto the trailer and engage the automatic latching device. In fact, the boat, while at idle speed, can be loaded onto the trailer and engage the automatic latching device with a minimal impact force. By floating the trailer in the water, the buoyancy of the boat is maintained throughout a majority of the loading process and this further contributes to the fact that there is less of an impact force on the automatic latching device and the boat hull.

However, if low water conditions exist at the loading ramp, the boat trailer wheels can still be in contact with the bottom of the water or the loading ramp surface when the boat trail is in the maximum back-in position and not floating.

By using air springs in the trailer suspension system, the trailer frame is lowered when the air pressure is exhausted and boat keel pressure is applied to the trailer back keel roller.

This can be accomplished by connecting the air spring air supply to the trailer tongue cylinder rod extending air supply. When the trailer tongue cylinder air supply is reversed, so as to lower the hinge and the front portion of the trailer frame, the air springs air supply would be exhausted. A suitable air spring for this application is offered by Firestone under their "SPORT-RITE" brand, with a six inch stroke.

BRIEF SUMMARY

A floating boat trailer for use with an automatic latching device for securing a boat includes a frame constructed and arranged to accommodate floatation panels, a hinged linkage mechanism having a spring steel extension blade attached to the trailer tongue, a pneumatic cylinder operable from a control transmitter to effect movement of the hinged linkage and a keel guide roller, mounted on a spring steel plate, located ahead of the bunker rails to keep the boat centered on the trailer and direct the U-bolt into the automatic latching device. A receiver, two pneumatic solenoid valves mounted on the winch stand and a hand-held transmitter to operate them. A sealed winch stand upright acts as an air system surge tank for a tongue-mounted air compressor, or for a compressor located in the towing vehicle. A pair of air springs, mounted in the trailer suspension system, allow the wheels to be raised or lowered by applying or removing air pressure.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
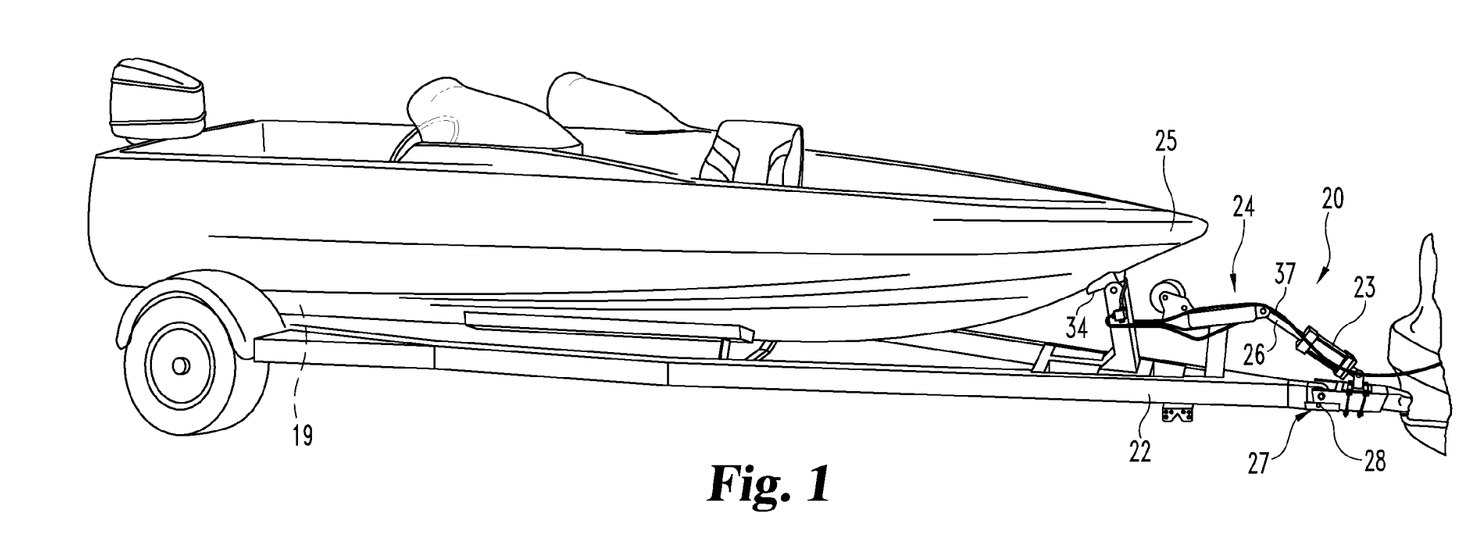
FIG. 1 is a perspective view of a floating boat trailer, with a boat thereon, according to one embodiment of the present invention.

Referring to FIG. 1, there is illustrated a floating boat trailer 20 according to the present invention. Boat trailer 20 is constructed of tubular metal material. Two floatation panels 19 are located at the rear of the trailer, inside the frame and under the guide rail bunkers (see FIG. 2). Each floatation panel 19 is a relatively large panel of floatation material securely attached to the frame of the trailer adjacent the wheels and below the guide rails 33 and 33*a*. Each floatation panel 19 is an encased "block" of styrofoam that is sized for the size and weight of the corresponding trailer considering the necessary buoyancy. The styrofoam block can be a single piece or made up of multiple panels. In the disclosed embodiment, each panel 19 measures 2 feet by 4 feet by 4 inches. The encasing structure is constructed and arranged with straps or brackets or similar structures to facilitate secure attachment to the frame. The specific design for these attachment accessories depends on the specific construction of the corresponding trailer.

Figure 7:
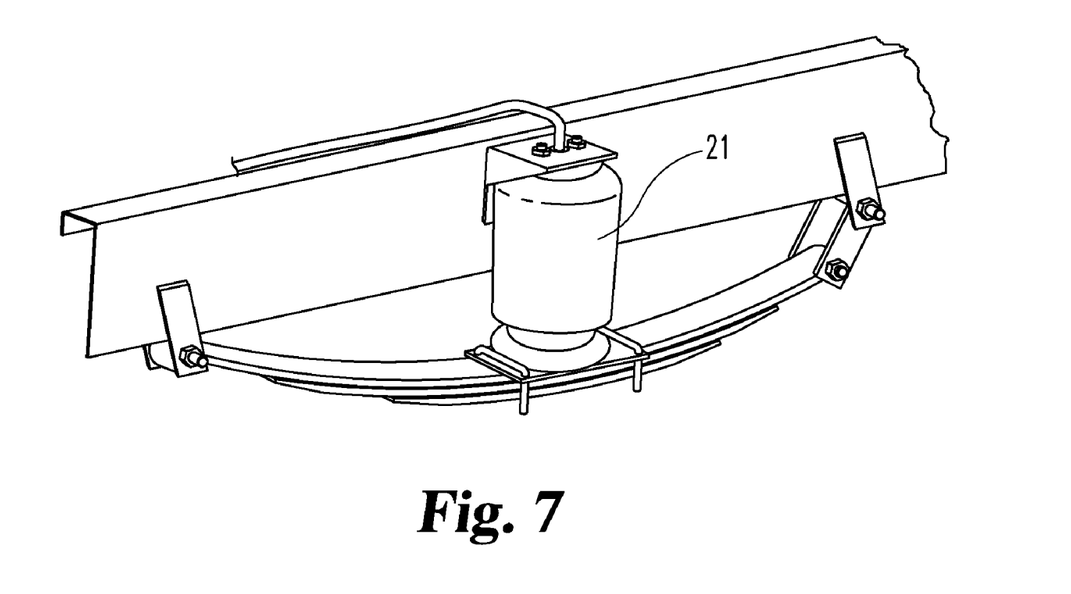
FIG. 7 is a perspective view of an air spring suspension system comprising part of the FIG. 1 floating boat trailer.

An air compressor and solenoid valve components can be constructed and arranged as part of the trailer tongue 22. High pressure hoses 37 connect the air compressor and solenoid valve to the tongue-mounted air cylinder 23 and the air springs 21 (see FIG. 7). The trailer tongue is hinged at hinge location 27 and the air cylinder 23 is connected between the tongue 22 and the winch stand 24 (see FIG. 3). A hydraulic system could be used to provide the required operating pressure. However, the air cushion feature provided by the pneumatic cylinder would not be available.

Figure 6:
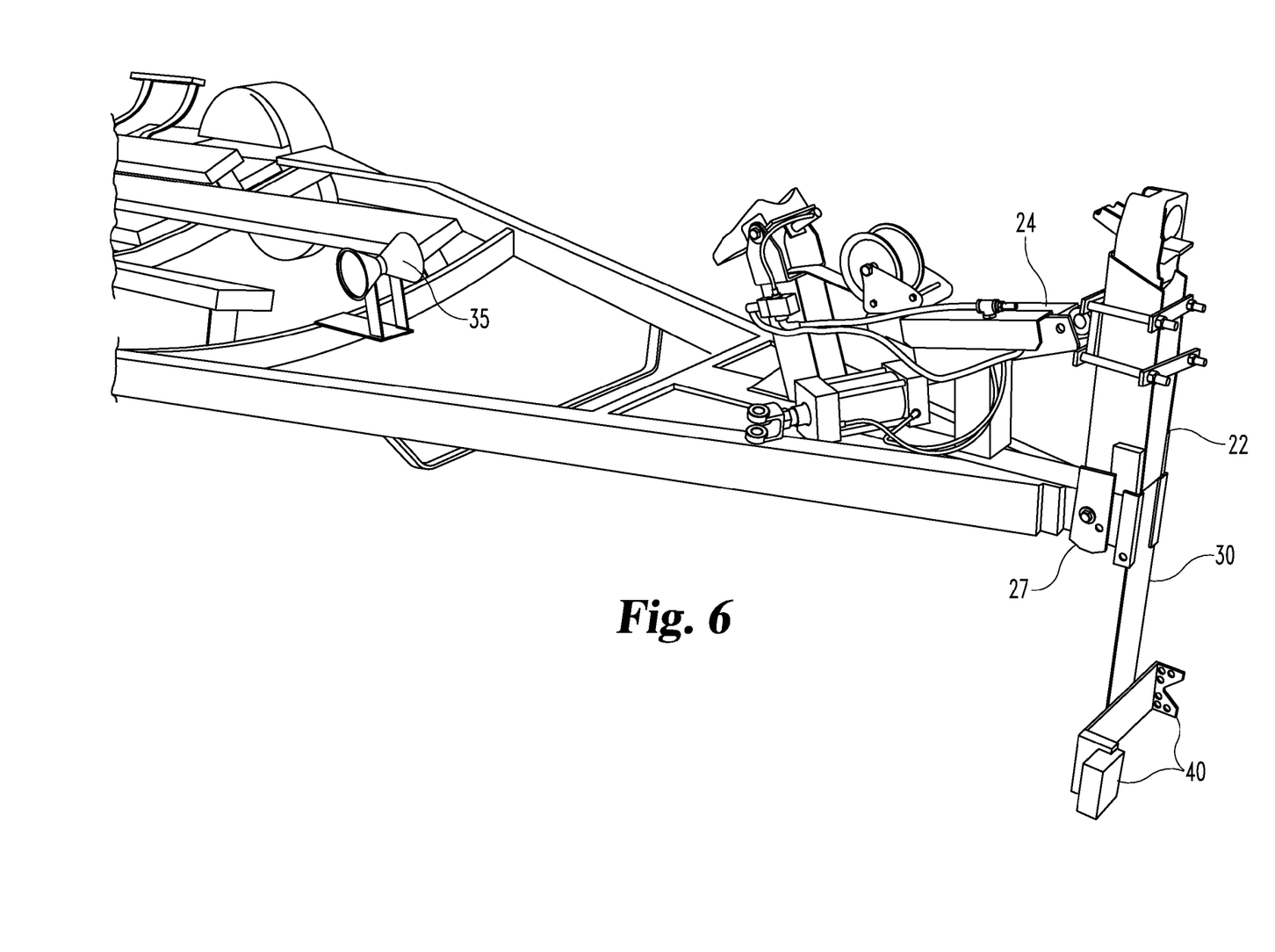
FIG. 6 is a partial, perspective view of the FIG. 1 floating boat trailer as arranged for storage.

FIG. 6 represents storage options for the trailer tongue 22 and winch stand 24 when the boat and trailer are being stored during the "off season". In FIG. 6, the trailer tongue 22 can be raised upright, to vertical, and this reduces the overall length, thereby facilitating storage.

Figure 2:
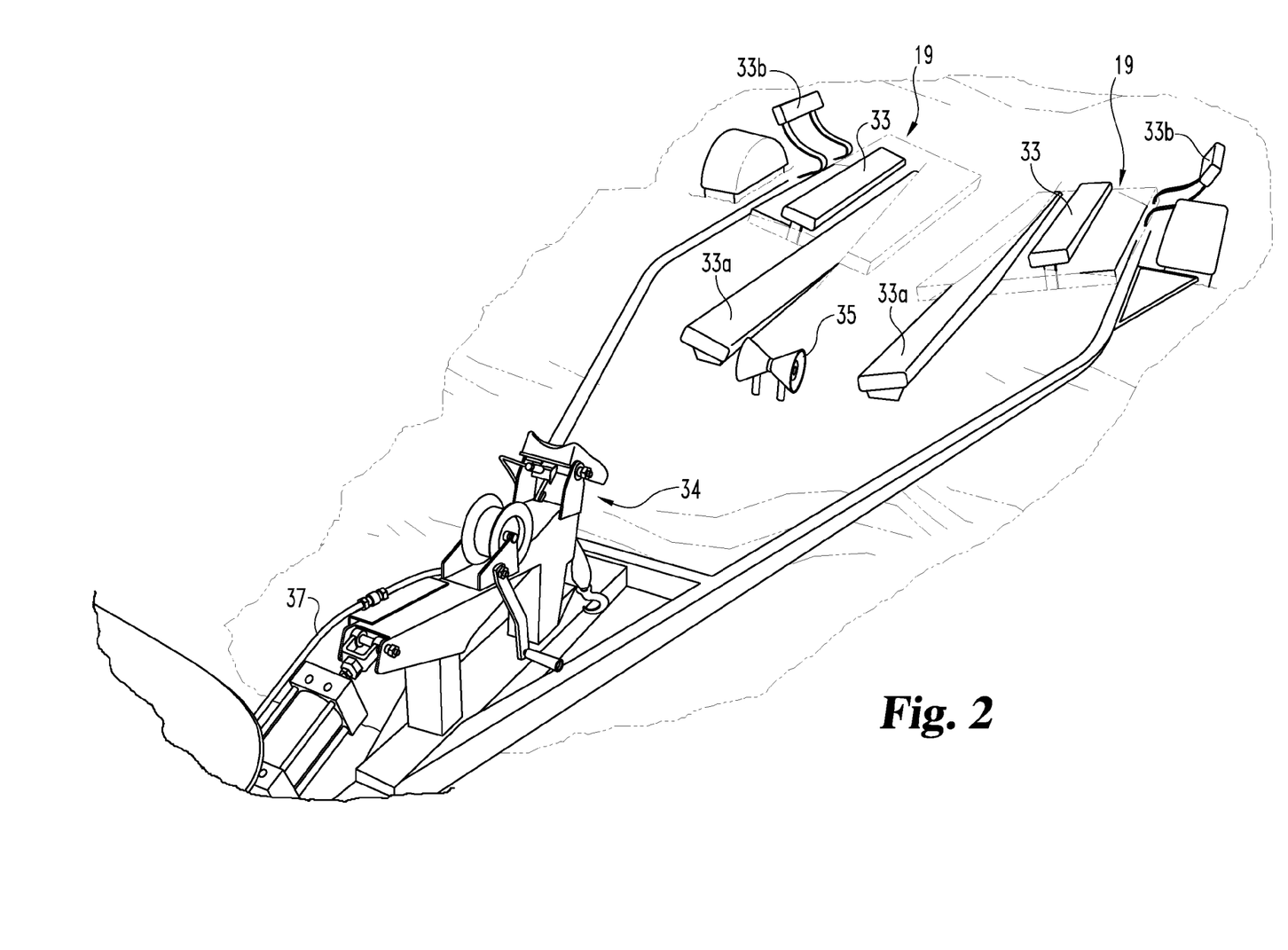
FIG. 2 is a partial, perspective view of the FIG. 1 floating boat trailer, without the boat.
Figure 3:
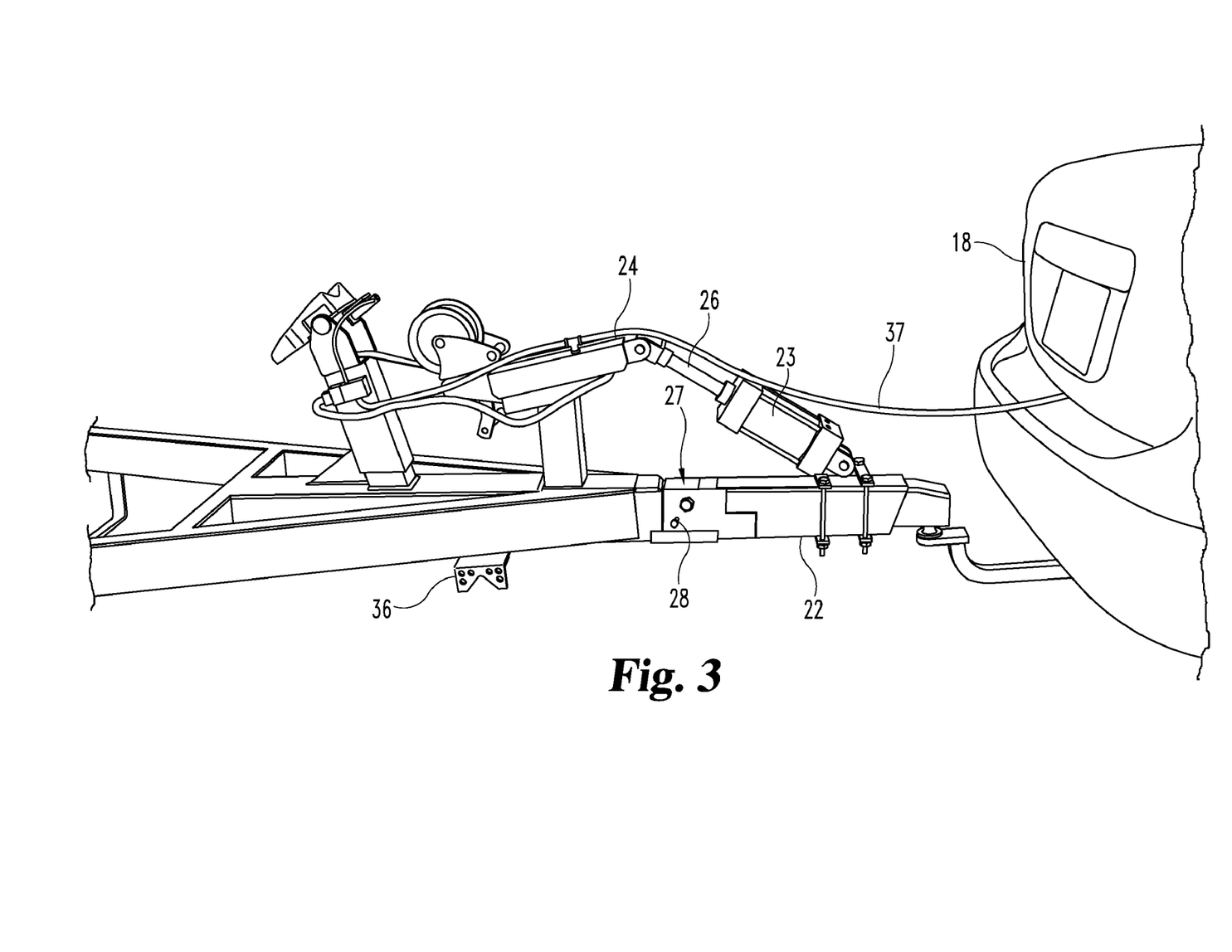
FIG. 3 is a partial, perspective view of the FIG. 1 floating boat trailer prior to being deployed into the water.
Figure 4:
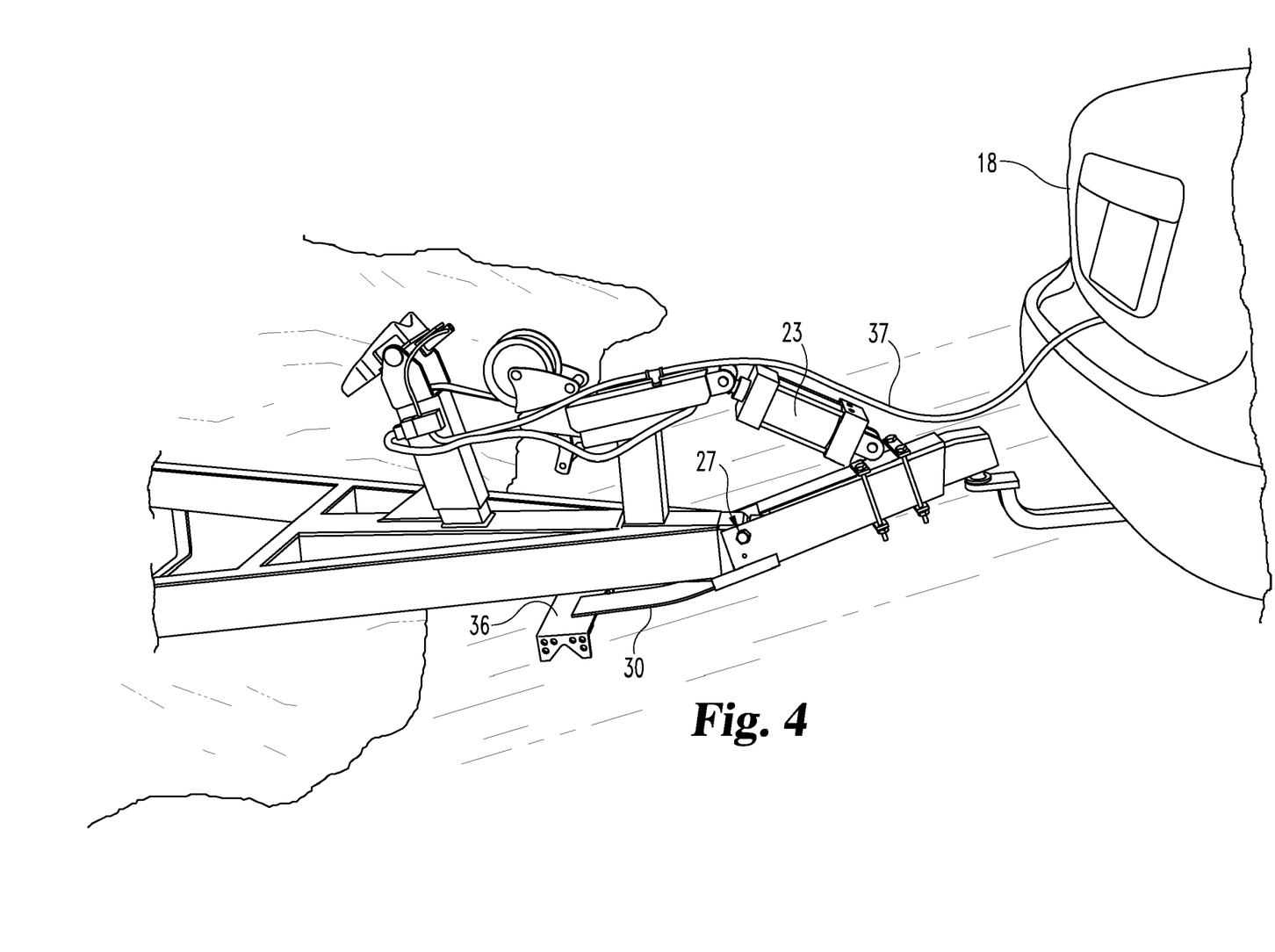
FIG. 4 is a partial, perspective view of the FIG. 1 floating boat trailer depicting the first step in the deployment.

Referring again to FIG. 1 and considering FIGS. 2, 3, and 4, when the boat 25 and trailer 20 are being towed, air pressure is applied to one end of air cylinder 23 and to the air springs 21 so that the air springs 21 and piston rod 26 are extended (see FIG. 3). Additionally, the air cylinder 23 and the air springs 21 act as shock absorbers that reduce the trailer hitch and ball bounce that can be caused by the flexing of the trailer frame.

One function of the trailer hinge is to move the trailer pivot point from the hitch ball to the hinge location 27. When preparing to load the boat 25 onto the trailer 20, the lower hinge bolt 28 (see FIG. 3) is removed prior to backing the trailer 20 into the water. The floatation panels 19 and the construction of trailer 20 allows the trailer to float on the surface of the body of water as the trailer 20 is backed into the water by the towing vehicle 18 (see FIG. 3). When the trailer hitch on the towing vehicle is approximately at the water's edge, the air solenoid valve is energized by a remote control transmitter and receiver 29 and this causes compressed air to be delivered to the opposite end of the air cylinder 23 and this retracts the piston rod 26 (see FIG. 5) and exhausts the air springs air supply. Retracting of the piston rod 26 lowers the hinged end of the trailer tongue into the water. The "front" section of the tongue is extended on the underside by spring steel plate 30, which extends toward the hinge location 27 and overlaps the hinge location 27. The construction of the present invention includes the spring steel stabilizer blade 30 (see FIGS. 4, 6). As the hinge location 27 is lowered into the water, the stabilizer blade 30 is lowered into the water. The spring steel extension stabilizer blade 30 is forced to bend around the hinge when the cross member 36 contacts the bottom of the body of water by the action of the air cylinder or alternatively the cross member 36 applies pressure to the ramp surface (see FIG. 4). The use of stabilizer blade 30 is to prevent the floating trailer from moving or shifting sideways.

With the present invention in this described state or condition, a boat can now be driven at idle speed onto the trailer and its forward movement is guided by the guide rails 33 and 33a and a pair of spaced-apart bunkers 33b that remain deployed above the surface of the body of water (see FIG. 2). When the boat keel contacts the center roller at the back of the trailer, the trailer is forced a few inches under water. Contact is maintained between the boat and trailer due to the upward floatation pressure. As the boat keel passes the forward end of the bunker rails, it contacts a guide roller 35 mounted on a spring steel plate that extends forward from a trailer cross member. The guide roller applies centering pressure to the keel as it is depressed and guides the keel mounted U-bolt into the auto latching device 34. Auto latching device 34 is described in U.S. Pat. No. 6,598,896, issued Jul. 29, 2003 to Hyslop. The '896 patent is incorporated by reference herein, in its entirety.

Figure 5:
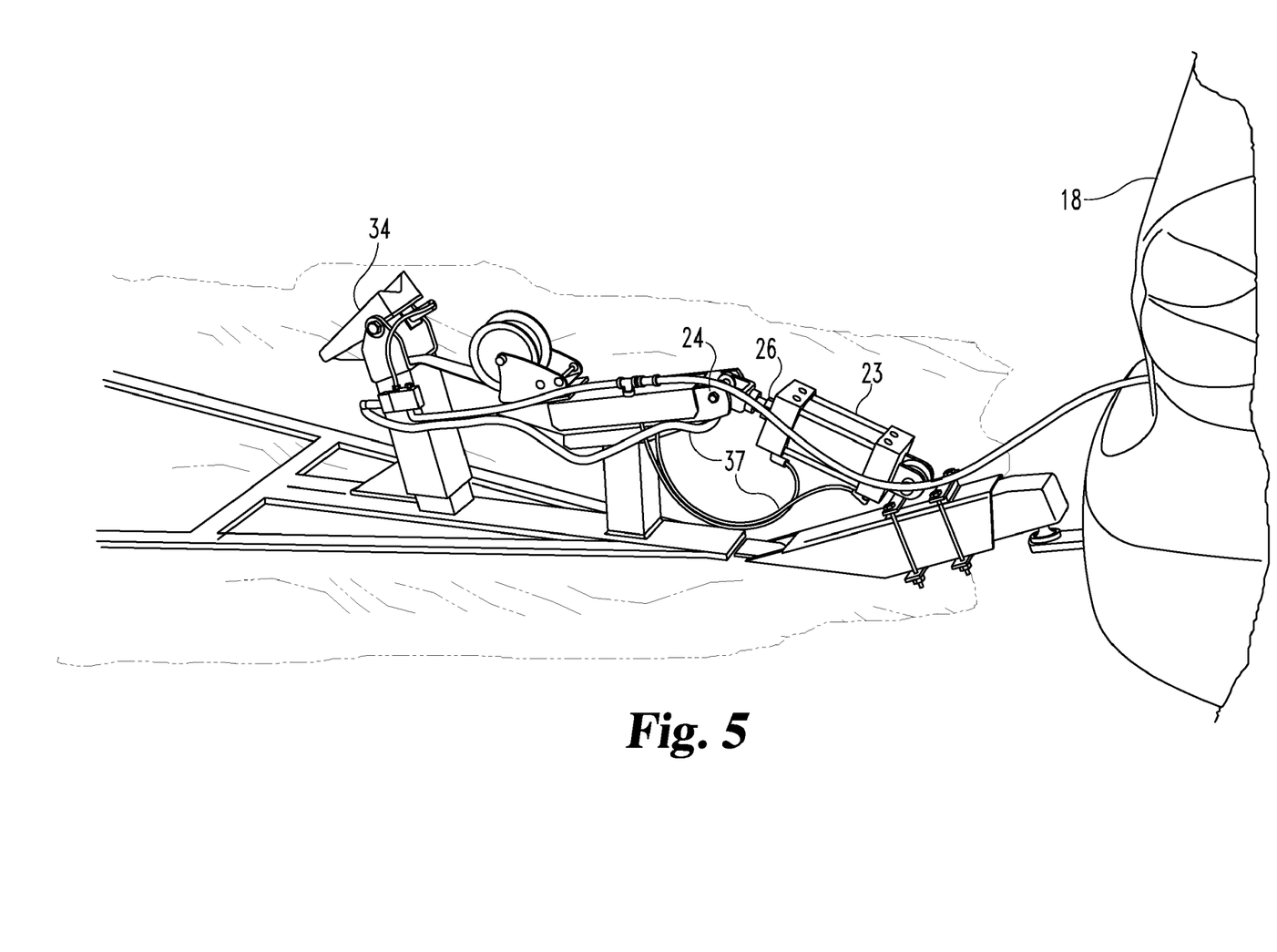
FIG. 5 is a partial, perspective view of the FIG. 1 floating boat trailer depicting the second step in the deployment process.

When the boat is fully forward on the trailer, it is secured by the automatic latching device 34 (see FIGS. 1, 5). Air pressure is now applied to the opposite end of the air cylinder and to the air springs. This extends the piston rod 26 and inflates the air springs 21, causing the trailer tongue to straighten (see FIG. 3) and thereby raising the boat. The boat and trailer can now be removed from the water. The lower hinge bolt 28 is now replaced (see FIG. 3), the winch strap and tie downs are attached, and the boat and trailer are then ready to travel.

When launching a boat, the tie downs and winch strap are removed. The floating boat trailer 20 is backed down the ramp into the water. The motor is started. A remote transmitter button is depressed, sending a signal to the receiver, which energizes the pneumatic solenoid valve, sending air pressure to the tongue mounted air cylinder, exhausting the air springs air, and the cylinder rod 26 is retracted. The cylinder action operates hinge location 27 and the stabilizer blade 30 cross member 36 contacts the ramp or the bottom of the body of water so as to keep the boat and trailer in position while unloading. The automatic latching device 34 is opened by depressing a hand-held transmitter, which energizes a pneumatic solenoid valve, that directs air pressure to the latching device air cylinder. Now the boat can be backed off the trailer under power and full control.

Figure 8:
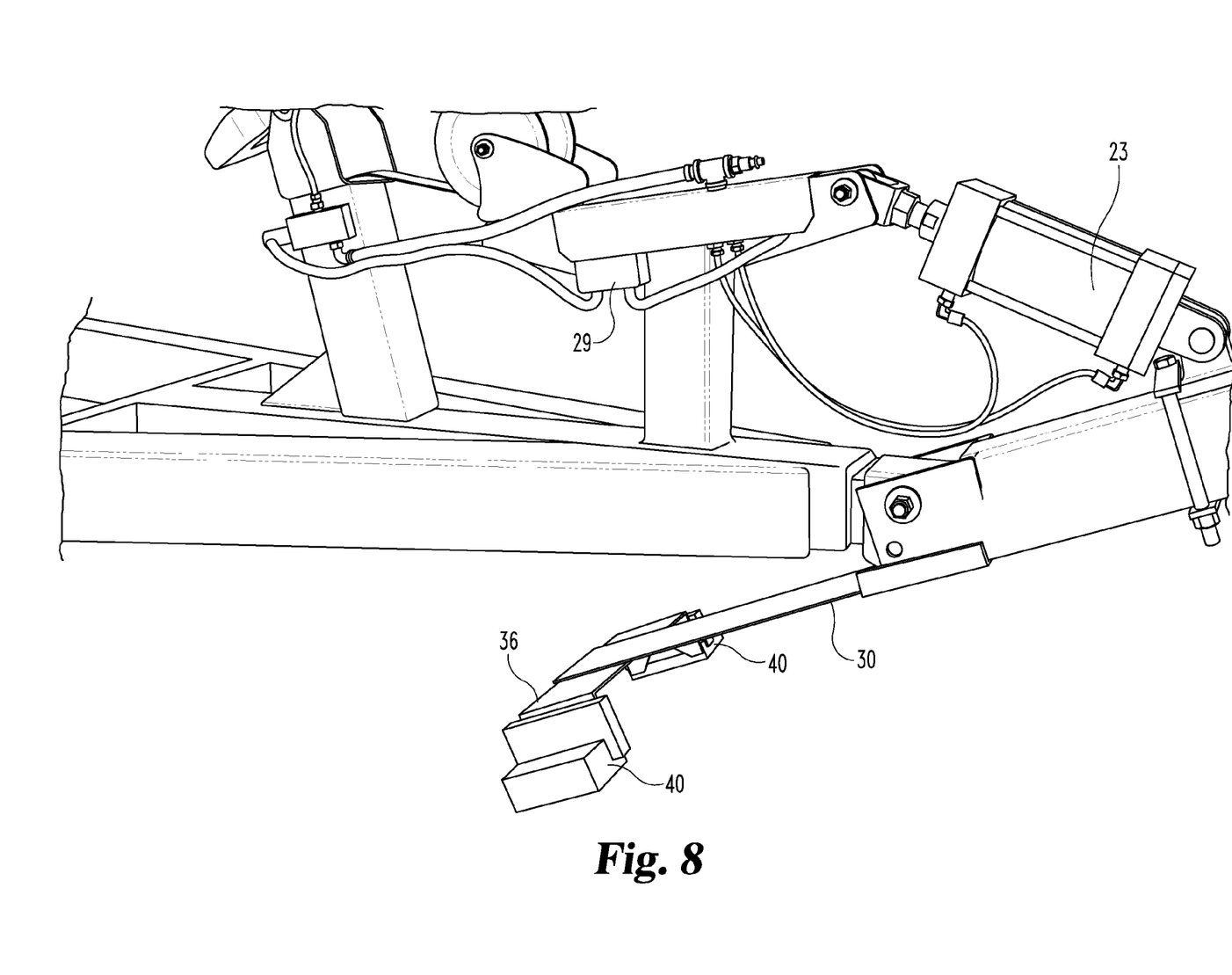
FIG. 8 is a partial, perspective view of an alternative stabilizer pad structure according to the present invention.

With regard to FIG. 8, an alternative design to the use of the spring steel stabilizer blade 30 is provided. The FIG. 8 embodiment contemplates the use of two spaced-apart stabilizer pads 40 that are mounted on the cross member 36 at the end of the spring steel tongue extension 30 and are constructed and positioned in the manner illustrated. It is contemplated that these two stabilizer pads 40 will also be controlled by air cylinder 23 and the spring steel tongue extension stabilizer pads will accommodate different surfaces and different depths.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A boat trailer for towing behind a vehicle, said boat trailer comprising:

a frame constructed and arranged in two sections that are pinned together to permit one section to move relative to the other section;

floatation means assembled to said boat trailer for enabling at least a portion of said boat trailer to float in water;

a latching device connected to a first frame section, said latching device constructed and arranged to automatically receive and secure a boat bow connection member; and which further includes a winch stand connected to said first frame section and a cylinder with an extendable and retractable rod, said cylinder being connected to a second frame section with said rod being connected to said winch stand.

2. The boat trailer of claim 1 wherein said floatation means includes a block of foam.

3. The boat trailer of claim 1 wherein said frame includes a distal end remote from said vehicle, said floatation means being positioned adjacent said distal end.

4. A method of boat loading from a body of water onto a boat trailer, said boat trailer including a frame with first and second sections that are hinged together, a winch, a latching device, and a cylinder with an extendable and retractable rod, said method comprising the following steps:

positioning a distal end of the trailer in the body of water;

positioning the boat, bow first in the direction of said distal end;

activating the cylinder to retract the rod, thereby lowering the hinged end of the first section into the water while exhausting air from an air spring; and moving the boat forward so as to load the boat onto the trailer and secure the boat to the trailer by the latching device.

5. A boat trailer for towing behind a vehicle, said boat trailer comprising:

a frame constructed and arranged in two sections that are pinned together to permit one section to move relative to the other section;

floatation means assembled to said boat trailer for enabling at least a portion of said boat trailer to float in water; and a winch stand connected to one frame section and a cylinder with an extendable and retractable rod, said cylinder being connected to the other frame section with said rod being connected to said winch stand.

6. The boat trailer of claim 5 wherein said floatation means includes a block of foam.

7. The boat trailer of claim 5 wherein said frame includes a distal end remote from said vehicle, said floatation means being positioned adjacent said distal end.

* * * * *